No. 643,373. Patented Feb. 13, 1900.
A. A. GABRIEL & E. M. ATKINSON.
PARCEL REST AND SEAT ANNEX FOR BICYCLES.
(Application filed Mar. 30, 1899.)
(No Model.)
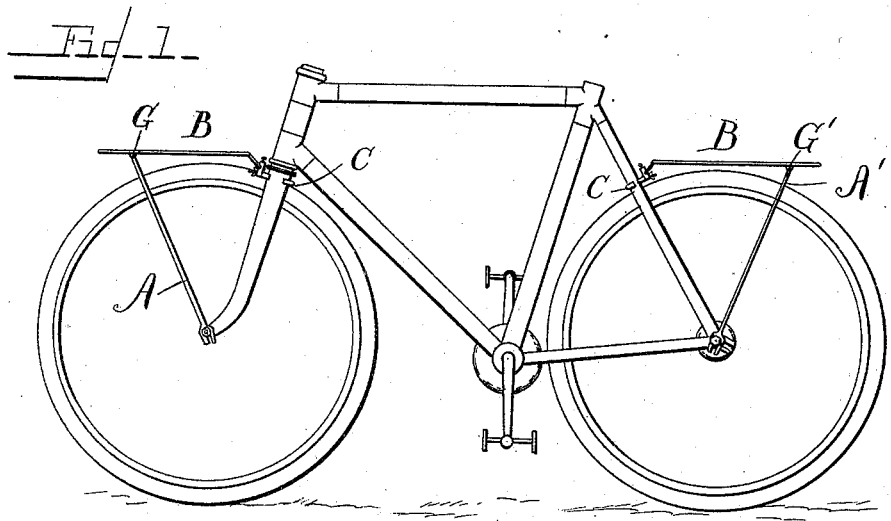
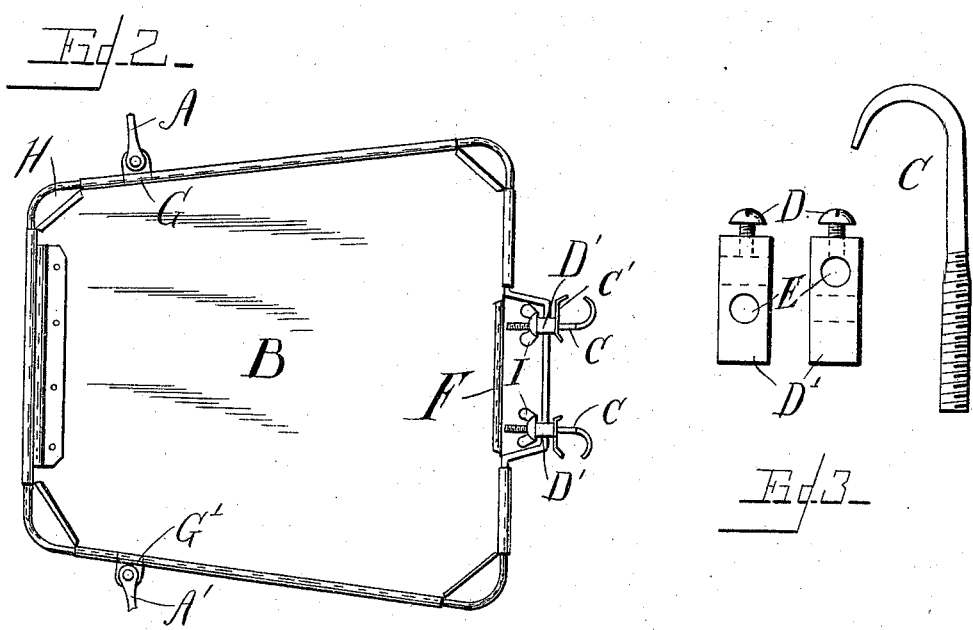

UNITED STATES PATENT OFFICE.

ALBERT A. GABRIEL AND EDWARD M. ATKINSON, OF PORTLAND, OREGON.

PARCEL-REST AND SEAT-ANNEX FOR BICYCLES.

SPECIFICATION forming part of Letters Patent No. 643,373, dated February 13, 1900.

Application filed March 30, 1899. Serial No. 711,158. (No model.)

*To all whom it may concern:*

Be it known that we, ALBERT A. GABRIEL and EDWARD M. ATKINSON, citizens of the United States, residing at Portland, in the county of Multnomah and State of Oregon, have invented a new and useful Parcel-Rest and Seat-Annex for Bicycles, of which the following is a specification.

Our invention relates to an improvement in parcel-rests or seats for velocipedes, and more particularly to bicycles and the like, and has for its object to so construct the same that it shall be cheap, durable, easily constructed, and capable of attachment and detachment from the machine, and also that it may be compactly folded for shipment.

In the drawings forming a part of this specification, and in which like symbols of reference represent corresponding parts in the several views, Figure 1 is a view of a bicycle with our improved attachment, showing its adaptation to the rear or front fork of the same. Fig. 2 is an inverted plan view of the same, and Fig. 3 shows a view of the various nuts and bolts for use in attaching the seat to a bicycle.

A A' are rods or uprights, forked or slotted at their ends and hinged by eyes formed in their ends to bands G G', which are supported by a rod surrounding the edge of the seat. The slots of the rods embrace the spindle back of the nuts and are therefore easily attached to the same.

B is the seat, which is preferably of metal, the edge of which is beaded to encircle a rod, said rod strengthening the same and also serving at certain parts, which are cut away, as at H, to form attaching means for the bolts, &c. The rod inclosed within the bead is turned down or offset at one side at substantially right angles for the purpose of bringing it to the level of the fork. Where this offset occurs, a rod F is inserted to strengthen the seat at said point.

C C' are bolts forming clamps and adapted to embrace a curve in the fork at the upper part.

D' D' are rods having eyes E passing through the same, said eyes being at substantially right angles to each other, one being adapted to receive the rod in the bead of the seat, while the other eye receives the hooked bolt C.

C' are hook-like washers adapted to be placed on the rod C beyond the washer or bolt D' and to form, with the hook of said rod C, a clamp for the bicycle-fork. By this arrangement the seat is capable of horizontal or vertical movement.

The rods D' are strung on the rod of the seat-frame before said rod is attached to the frame, and said rods D' are adapted to be adjusted along said seat-rod by means of setscrews D.

I are thumb-screws for rod C, its purpose being to clamp said rod and its parts to the bicycle-frame.

The hook of rod C is preferably covered with rubber tubing, and washer C' may be likewise covered for the purpose of preventing abrasion of the bicycle-frame, or the fork itself may be covered with rubber to serve a like purpose.

The operation of the device is as follows: The rods A being extended are placed upon the axle of the velocipede and the bolts C are hooked around the forks of the same, and by a manipulation of the thumb-screws I the seat is securely fastened to the frame of the machine.

Having now fully described our invention, what we claim as new, and desire to secure by Letters Patent, is—

In a device of the character described, the combination with a plate or platform, of forked and hinged rods extending from the same and adapted to embrace the axle of the machine, a rod extending from the opposite side of the same and having short rods adjustable thereon, hooked bolts penetrating said short rods, a hooked washer interposed between the short rod and the hook of the bolt, and a thumb-screw for adjusting and securing said rod or bolt, substantially as described.

ALBERT A. GABRIEL.
EDWARD M. ATKINSON.

Witnesses:
H. H. NEWHALL,
F. O. WEEKS.